(12) United States Patent
Mukherjee et al.

(10) Patent No.: US 11,296,940 B2
(45) Date of Patent: *Apr. 5, 2022

(54) CENTRALIZED CONFIGURATION DATA IN A DISTRIBUTED FILE SYSTEM

(71) Applicant: Red Hat, Inc., Raleigh, NC (US)

(72) Inventors: Atin Mukherjee, Bangalore (IN); Kaushal Madappa, Mysore (IN)

(73) Assignee: Red Hat, Inc., Raleigh, NC (US)

( * ) Notice: Subject to any disclaimer, the term of this patent is extended or adjusted under 35 U.S.C. 154(b) by 213 days.

This patent is subject to a terminal disclaimer.

(21) Appl. No.: 16/241,707

(22) Filed: Jan. 7, 2019

(65) Prior Publication Data

US 2019/0140902 A1 May 9, 2019

Related U.S. Application Data

(63) Continuation of application No. 15/055,914, filed on Feb. 29, 2016, now Pat. No. 10,187,255.

(51) Int. Cl.
*H04L 12/24* (2006.01)
*H04L 41/0813* (2022.01)
*G06F 16/182* (2019.01)

(52) U.S. Cl.
CPC ...... *H04L 41/0813* (2013.01); *G06F 16/1824* (2019.01)

(58) Field of Classification Search
USPC .................................. 709/217, 220, 221, 223
See application file for complete search history.

(56) References Cited

U.S. PATENT DOCUMENTS

| 7,509,324 | B2 | 3/2009 | Burr et al. |
| 8,595,546 | B2 | 11/2013 | Dalton |
| 8,606,756 | B2 | 12/2013 | Lauer et al. |
| 9,009,277 | B2 * | 4/2015 | Peters ................ H04L 41/0813 709/221 |
| 10,187,255 | B2 * | 1/2019 | Mukherjee .......... G06F 16/1824 |
| 10,996,858 | B2 * | 5/2021 | Zhao ....................... G06F 3/061 |

(Continued)

FOREIGN PATENT DOCUMENTS

CN 104202383 A 12/2014

OTHER PUBLICATIONS

Mukherjee, Atin, "Using consensus algorithm and distributed store in designing distributed system", 26 pages, slide presentation, downloaded from http://www.slideshare.net/AtinMukherjee/consensus-algo-withdistributedkeyvaluestoreindistributedsystem on Dec. 11, 2015.

(Continued)

*Primary Examiner* — Dhairya A Patel
(74) *Attorney, Agent, or Firm* — Lowenstein Sandler LLP (57) ABSTRACT

A request to change a configuration of a distributed storage system that includes servers may be received. A subset of the servers of the distributed storage system that is included in a configuration cluster may be identified. Each of the servers in the configuration cluster may store configuration data of the distributed storage system. An indication to modify the configuration data of the subset of the servers in the configuration cluster of the distributed storage system may be provided in view of a verification of the change to the configuration of the distributed storage system.

20 Claims, 7 Drawing Sheets

(56) References Cited

U.S. PATENT DOCUMENTS

| | | | |
|---|---|---|---|
| 2006/0053216 A1* | 3/2006 | Deokar | G06F 9/5061 709/223 |
| 2006/0279628 A1* | 12/2006 | Fleming | H04N 21/4223 348/143 |
| 2007/0174660 A1* | 7/2007 | Peddada | H04L 67/1034 714/4.1 |
| 2008/0201465 A1 | 8/2008 | Jones et al. | |
| 2010/0114826 A1* | 5/2010 | Voutilainen | H04L 67/1095 707/638 |
| 2011/0078290 A1* | 3/2011 | Calo | G06F 9/5094 709/221 |
| 2013/0218835 A1* | 8/2013 | Greenspan | G06F 16/355 707/610 |
| 2014/0215258 A1 | 7/2014 | Chen | |
| 2014/0237095 A1 | 8/2014 | Bevilacqua-Linn | |
| 2015/0081856 A1* | 3/2015 | Rider | G06F 9/44505 709/220 |
| 2017/0092246 A1* | 3/2017 | Manjarrez | G10H 1/0008 |
| 2017/0250863 A1* | 8/2017 | Mukherjee | H04L 41/0813 |
| 2021/0004874 A1* | 1/2021 | Bur | G06Q 30/0269 |
| 2021/0292139 A1* | 9/2021 | Moreno Bustamante | B66D 1/505 |
| 2021/0342785 A1* | 11/2021 | Mann | G06Q 10/0633 |

OTHER PUBLICATIONS

Tsal-Tsalko, Oleg, "Distributed Systems and Scalability Rules", 45 pages, slide presentation, downloaded from http://www.slideshare.net/olegtsaltsalko9/distributed-systems-and-scalability-rules on Dec. 11, 2015.

"HP StoreVirtual Storage Multi-Site Configuration Guide", Mar. 2013, 40 pages, Hewlett-Packard Development Company, L.P.

Yermolaiev, Oleg, "Managing configuration of a distributed system with Apache ZooKeeper", Aug. 15, 2014, 9 pages, SkyGears blog downloaded from http://sysgears.com/articles/managing-configuration-of-distributed-system-with-apache-zookeeper/ on Dec. 11, 2015.

* cited by examiner

CENTRALIZED CONFIGURATION DATA IN A DISTRIBUTED FILE SYSTEM

RELATED APPLICATION

This continuation patent application claims priority to U.S. patent application Ser. No. 15/055,914 filed on Feb. 29, 2016, which is herein incorporated by reference.

TECHNICAL FIELD

Aspects of the disclosure relate generally to a distributed file system and, more specifically, relate to centralized configuration data in a distributed file system.

BACKGROUND

A distributed file system may be a file system that stores data across multiple servers. For example, files may be stored in the distributed file system across multiple storage resources that are managed by multiple servers. Users may access the distributed file system by logging in to a client system and requesting access to read files that are stored in the distributed file system or to write files to be stored in the distributed file system.

Servers may be added or removed from the distributed file system. For example, when a server is added to the distributed file system, a corresponding storage resource may be used to store files for the distributed file system. When a server is removed from the distributed file system, the corresponding storage resource may no longer be used to store files for the distributed file system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure relate to centralized configuration data in a distributed file system. A cloud computing infrastructure or system may be a type of distributed computing system including multiple servers that are part of a distributed file system. Each of the servers of the distributed file system may be associated with or manage a storage resource to store files.

The configuration of the distributed file system may be changed by adding or removing servers that are used to store files in the distributed file system. For example, a server may be added to a cluster of servers to increase the storage capacity of the distributed file system or another server may be removed from the cluster of servers to decrease the storage capacity of the distributed file system. When the configuration of the distributed file system is changed, then configuration data of the distributed file system that is stored at each server of the cluster of servers may also be changed. The configuration data may identify servers that are used in the distributed file system. As an example, when one of the servers receives a request to add a new server to the cluster of servers of the distributed file system, then the configuration data that is stored at each of the servers may be updated to reflect the adding of the new server. Such an updating may involve the server receiving the request to transmit data associated with adding the new server to each of the other servers of the cluster so that the configuration data stored at each of the servers may be updated in response to the adding of the new server. The transmitting of the data between the servers of the cluster may congest a network used by the distributed file system and lower response times for the servers of the cluster as each server may update the locally stored configuration data.

Instead of storing the configuration data at each of the servers of the cluster, a subset (or proper subset) of the servers in the cluster of the distributed file system may be used to store the configuration data. Such servers may be referred to as being part of a configuration cluster within the cluster of servers. Thus, servers that are part of the configuration cluster may store files of the distributed file system as well as configuration data of the distributed file system while servers that are not part of the configuration cluster may not store the configuration data but may store files of the distributed file system.

One of the servers in the configuration cluster may be designated as a leader server that may be used to receive requests to change the configuration of the distributed file system. For example, the distributed file system may include 100 servers that store files and a subset of the 100 servers corresponding to ten servers may be part of the configuration cluster that stores files and configuration data of the distributed file system. One of the subset of ten servers of the configuration cluster may be selected as the leader server for the distributed file system. In some embodiments, the server in the configuration cluster that is selected to be the leader may be changed after a time period. When one of the servers (i.e., of the 100 servers) receives a request to add a new server to the distributed file system, the request may be forwarded to the leader cluster. As described in further detail below, the leader cluster may perform a verification of the new server to be added to the distributed file system and may transmit information associated with the configuration of the distributed file system to the other clusters in the configuration cluster. The leader server may then include the new server in the distributed file system by adding the new server to the configuration data as well as transmit information to each server in the configuration cluster to add the new server to the locally stored configuration data of each of the other servers in the configuration cluster.

The use of the leader server and the configuration cluster may thus reduce network congestion of the distributed file system as less data may be transmitted between the servers. For example, instead of transmitting the data to update configuration data at every server of the distributed file system, the transmission of the data to update configuration data may occur between the subset of the servers that are in the configuration cluster. Furthermore, since the servers in the configuration cluster update the configuration data and the servers outside of the configuration cluster do not include configuration data to update, the overall response time for each of the servers in the configuration cluster may be improved as well.

In some embodiments, the selection of a server to be included in the configuration cluster may be based on characteristics of the servers of the distributed file system. For example, a network administrator of the distributed file system may decide to add a new server to the distributed file system. In response to the adding of the new server, characteristics of servers currently used in the distributed file system as well as characteristics of the new server to be added may be identified. The new server may be added to the configuration cluster or may not be added to the configuration cluster based on the characteristics of the current servers of the distributed file system that are included in the configuration cluster and the characteristics of the new server. In some embodiments, the characteristics may correspond to a location of a respective server. For example, if the new server is in a different location than the current servers of the configuration cluster, then the new server may be added to the configuration cluster when the new server is added to the distributed file system. The adding of the new server based on location may provide better security or consistency of the configuration data by ensuring that servers in multiple locations store the configuration data of the distributed file system.

Aspects of the present disclosure address the above and other deficiencies by utilizing a configuration data controller to update configuration data of a distributed file system and to add servers to the configuration cluster of the distributed file system. The configuration data controller may identify the configuration cluster, identify a leader server of the configuration cluster, and may recommend to add new servers to the configuration cluster.

Figure 1:
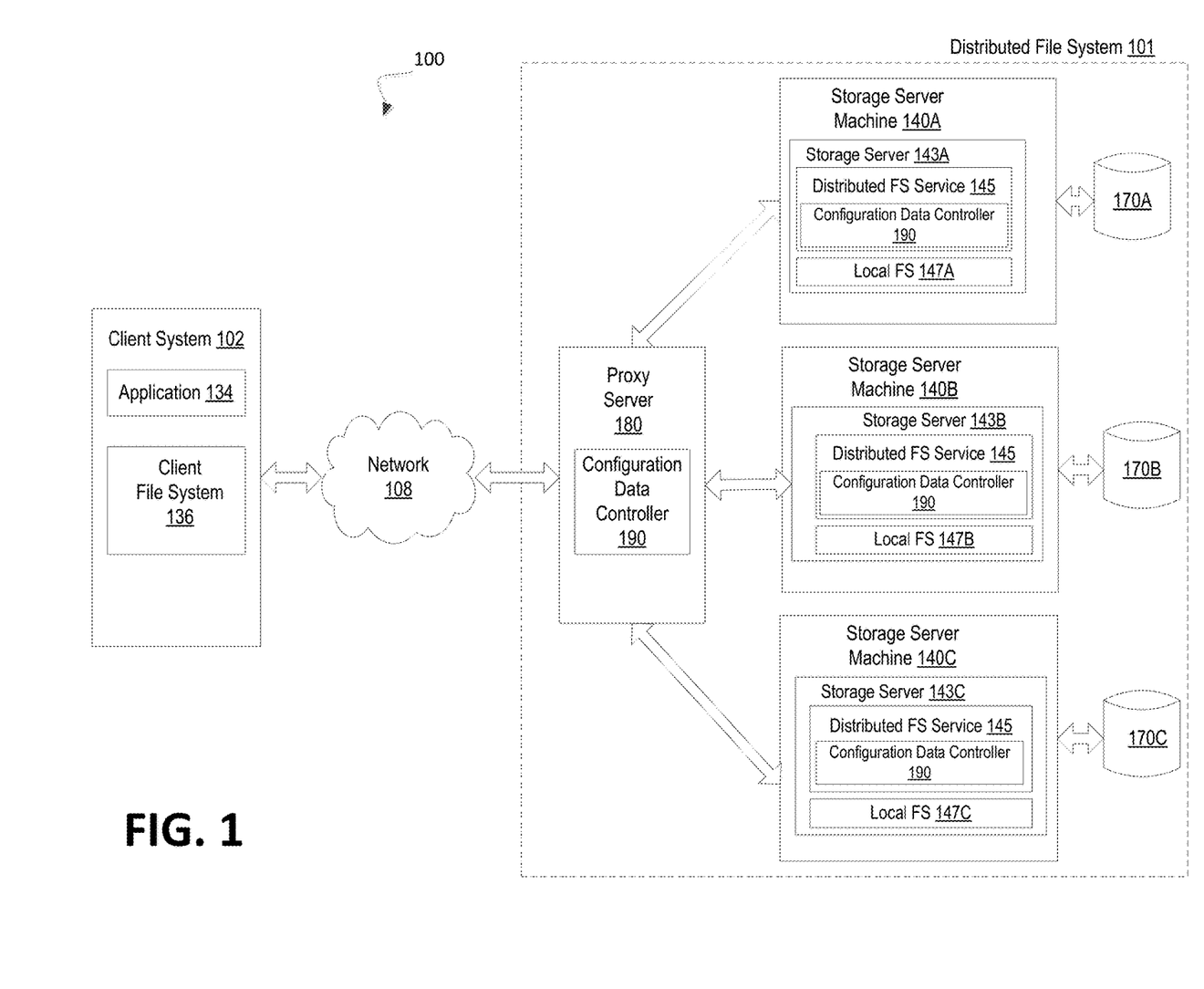
FIG. 1 illustrates an example system architecture in which embodiments of the disclosure may operate.

FIG. 1 is an example system architecture 100 for various implementations of the disclosure. The system architecture 100 may include a distributed file system 101 coupled to one or more client machines 102 via a network 108. The network 108 may be a public network (e.g., the Internet), a private network (e.g., a local area network (LAN) or wide area network (WAN)), or a combination thereof. Network 108 may include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The distributed file system 101 may be a network attached storage file system that includes one or more storage server machines 140A, 140B, and 140C, each of which may control and manage any number of storage resources 170A, 170B, and 170C. A storage server machine 140A-C may include a network-accessible server-based functionality (e.g., storage server 143A-C) or other data processing equipment. The storage server machines 140A-C may include, but are not limited to, any data processing device, such as a desktop computer, a laptop computer, a mainframe computer, a personal digital assistant, a rack-mount server, a hand-held device or any other device configured to process data. The storage server machines 140A-C of the distributed file system 101 may be grouped into one or more clusters. A cluster may be a group of linked storage servers 143A-C working together closely.

The storage resources 170A-C may be mass storage devices, such as magnetic or optical storage based disks, solid-state drives (SSDs) or hard drives, coupled to the storage server machines 140A-B (either directly or via the network 108). The storage resources 170A-C may also include memory such as random access memory (RAM), Flash memory, and so forth. For convenience, some embodiments provided herein may be described with reference to disks or other mass storage devices. However, it should be understood that such embodiments may also apply to memory storage resources.

Storage servers 143A-C may each host a local file system that manages the storage of data on storage resources 170A-C. Each of the storage resources 170A-C may be formatted in accordance with a particular local file system (FS) 147A-C. The local FS 147A-C may create directories, partitions, logical volumes, and so forth on the storage resources 170A-C as well as store data (e.g., files) thereon. Examples of local disk file systems that may be used on disk storage resources include, but are not limited to, EXT3, EXT4, XFS, NTFS, FAT16, FAT32, and so forth. Various flash file systems, tape file systems, optical disc file systems, memory files systems and so on may alternatively be used for other non-disk storage resources (e.g., for memory storage resources).

Storage servers 143A-C may each additionally include an instance of a distributed file system (FS) service 145. The distributed FS service 145 interfaces with local file systems 147A-C to store files on the storage resources 170A-C, as well as allow retrieval of stored files to the client system 102. The distributed file system service 145 instances additionally interface with one another to form the distributed file system 101.

The distributed file system services 145, and thus the distributed file system 101, may store data as files and may include directories, also referred to as folders, which are virtual containers within the distributed file system 101, in which groups of computer files and possibly other directories may be kept and organized. The distributed file system 101 may organize data (e.g., files, directories, or subdirectories) in the disks 170A-C using volumes. A volume may be a single accessible storage area of the distributed file system 101, which can be resident on a single partition or directory of a hardware resource 170A-C (e.g., of a hard disk) of the file system 101. A volume can be a representation of a logical location, rather than a physical location, of a storage area in the file system 101. For example, a physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. Additionally, the volume may be a collection of multiple logical and/or physical locations.

In some embodiments, a volume of the distributed file system 101 may be associated with multiple disks 170A-C. Files of a volume may be stored across the disks 170A-C. For example, a volume label "C:" may be assigned to a partition of a first hardware resource 170A, a partition of a second hardware resource 170B, and a partition of a third hardware resource 170C. As such, files of a single volume may be distributed between multiple hardware resources 170A-C.

Any number of client system 102 may include a client file system 136 to communicate with the storage servers 143A-C in the file system 101. The client system 102 may a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The client machines 102 may host one or more applications 134. An application 134 may be any type of application including, but not limited to, a web application, a desktop application, a browser application, etc. An application 134 may request access (e.g., read, write, etc.) to the data in the distributed file system 101. For example, the application 134 may request read or write files stored in a volume associated with disks 170A-C.

The distributed file system 101 may include a configuration data controller 190 that is part of a proxy server 180 that receives write operations or read operations for files in the distributed file system 101 from the client system 102. Write operations or read operations for files are described, but such operations may also apply to other objects such as directors and sub-directories. The configuration data controller 190 may be used to modify configuration stored at particular storage servers as described in further detail below. In some embodiments, each of the storage server machines 140A-140C may further include the configuration data controller 190.

Figure 2:
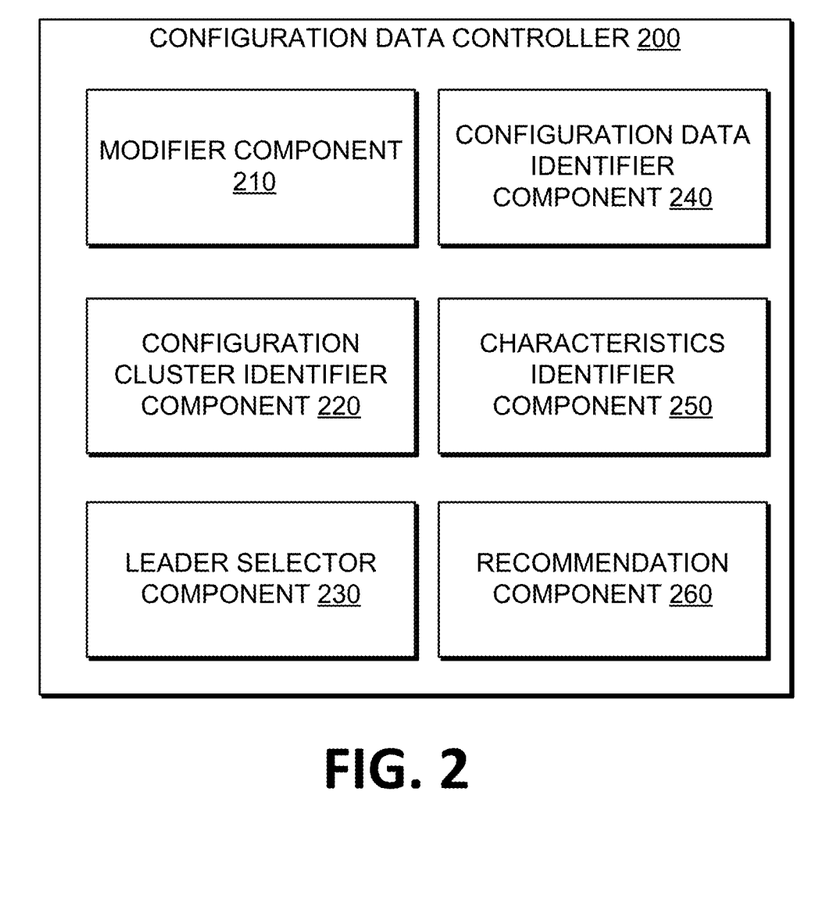
FIG. 2 illustrates an example configuration data component in accordance with some embodiments of the disclosure.

FIG. 2 is a block diagram of an example configuration controller 200. In general, the configuration controller 200 may correspond to the configuration controller 190 of FIG. 1. The file configuration controller 200 may include a modifier component 210, a configuration cluster identifier component 220, a leader selector component 230, a configuration data modifier component 240, a characteristics identifier component 250, and a recommendation component 260. In alternative embodiments, the functionality of one or more of the components may be combined or divided.

As shown in FIG. 2, the configuration data controller 200 may include a modifier component 210 that may receive a request to modify a configuration of a distributed file system. The modification of the distributed file system may be an adding of a server to store files in the distributed file system or a removing of a server that is currently being used to store files in the distributed file system. In some embodiments, the modification may correspond to a modification of metadata associated with the distributed file system. The request may be received by a leader of a configuration cluster and from another server of the distributed file system as described in further detail below. The configuration data controller 200 may further include a configuration cluster identifier component 220 that may identify servers of the distributed file system that are part of the configuration cluster. Furthermore, the leader selector component 230 may select one server that is part of the configuration cluster as the leader server of the configuration cluster. In some embodiments, the leader server may be selected based on a process that selects one server as a leader (e.g., a consensus process such as the Raft process). As such, the leader server may be the one server in the configuration cluster that has been assigned as the leader server based on a consensus process. The server in the configuration cluster that is assigned to be the leader server may be changed based on a time period used by the process that selects the leader server. For example, a consensus process may select a first server to be the leader server for a first time period and after the first time period has expired or passed, then a second server may be selected to be the leader server (e.g., the first server is removed from being the leader server) for another time period.

The configuration data controller 200 may further include a configuration data modifier component 240 that may be used to modify configuration data stored at each of the servers of the configuration cluster. In some embodiments, the configuration data modifier component 240 may be used to verify that a server to be added to the distributed file system is not already included in the distributed file system. For example, a query may be transmitted to other servers in the configuration cluster to identify whether the server to be added is already included in the distributed file system. Each of the servers in the configuration cluster may return a message in response to the query to identify whether the server to be added is already included in the distributed file system. A server may be considered to already be included in the distributed file system if the configuration data identifies that a name or identification of the server is included in the distributed file system. In some embodiments, the configuration data modifier component 240 may verify whether a new server that is to be added to the distributed file system is compatible with the other servers that are currently in the distributed file system. For example, a determination may be made as to whether a version number of the new server that is to be added is compatible with each other server that is currently in the distributed file system. If the version number of the new server is not compatible with each of the current servers, then the new server may not be added to the distributed file system. However, if the version number of the new server is compatible with each of the current servers in the distributed file system, then the new server may be added to the distributed file system.

Referring to FIG. 2, the configuration data controller 200 may include a characteristics identifier component 250 and a recommendation component 260. The characteristics identifier component 250 may identify characteristics of the servers currently included in the distributed file system or characteristics of the servers currently part of the configuration cluster in the distributed file system. Furthermore, the characteristics identifier component 250 may identify characteristics of the server to be added to the distributed file system. In some embodiments, the characteristics of a server to be removed from the distributed file system may also be identified. The recommendation component 260 may provide a recommendation to include the server to be added to the distributed file system to the configuration cluster or may make a recommendation to add a current server to the configuration cluster in response to a removing of another server that is included in the configuration cluster from the distributed file system.

Figure 3:
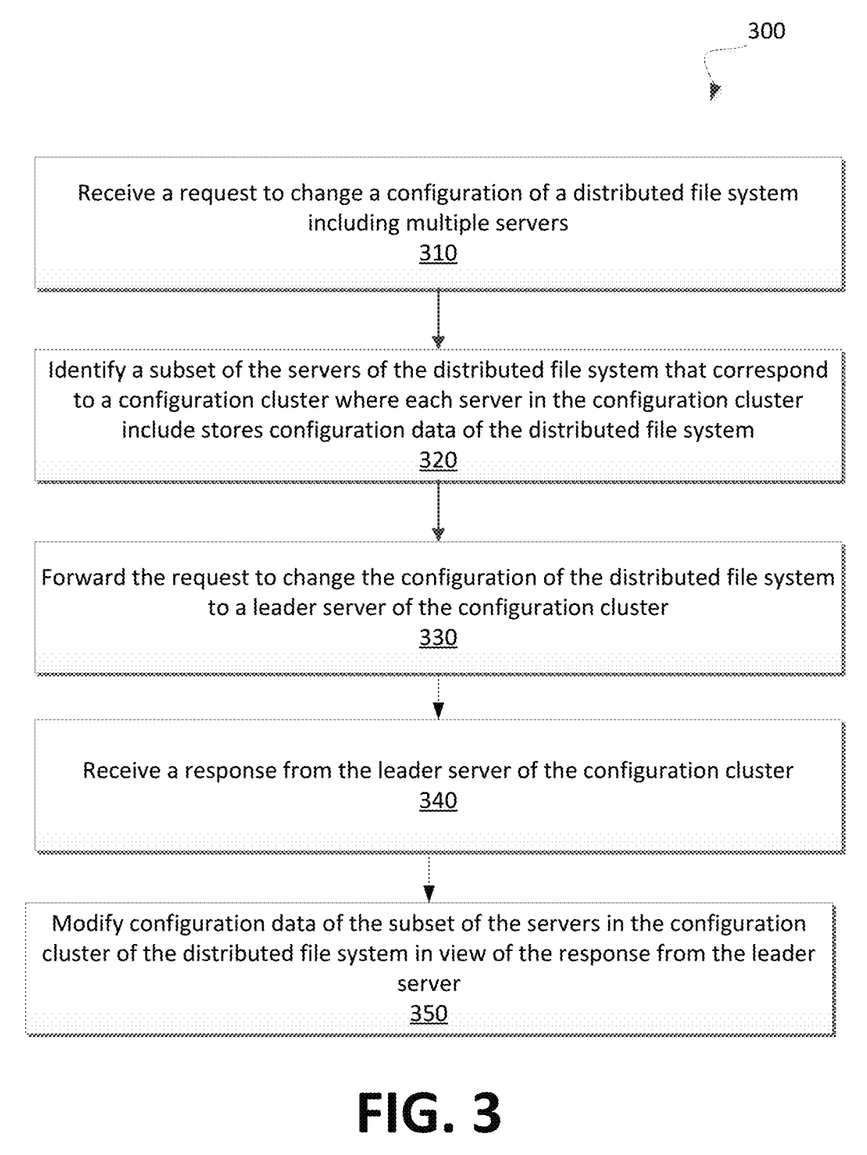
FIG. 3 is a flow diagram of an example method to modify configuration data of a distributed file system in accordance with some embodiments.

FIG. 3 is a flow diagram of an example method 300 to modify configuration data of a distributed file system. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a configuration data controller 190 or 200 as described with regard to FIG. 1 or 2.

As shown in FIG. 3, the method 300 may begin with the processing logic receiving a request to change a configuration of a distributed file system that includes multiple servers (block 310). For example, a request to remove a server from or to add a server to the distributed file system may be received. In response to receiving the request, the processing logic may identify a subset of the servers of the distributed file system that correspond to a configuration cluster where each server in the configuration cluster stores configuration data of the distributed file system (block 320). Thus, a portion of the servers of the distributed file system that are included in a configuration cluster may be identified. For example, a proper subset of the servers of the distributed file system may be identified as being part of the configuration cluster. In some embodiments, each server of the distributed file system may include an identification of whether it is included in the configuration cluster or the configuration data stored at each of the servers in the configuration cluster may include identifications of each server that is in the configuration cluster. The processing logic may further forward (e.g., transmit) the request to change the configuration of the distributed file system to a leader server of the configuration cluster of the distributed file system (block 330). For example, a process to select one server from the configuration cluster as the leader server may be initiated and the request may be forwarded or transmitted to the selected leader server. In some embodiments, the leader server may be previously identified and stored in at the server that receives the initial request to change the configuration of the distributed file system. Subsequently, the processing logic may receive a response from the leader server of the configuration cluster (block 340). For example, the response may indicate that a server to be added to the distributed file system has been verified or has not been verified.

As shown in FIG. 3, the processing logic may further modify configuration data of the subset of the servers in the configuration cluster of the distributed file system in view of the response from the leader server (block 350). For example, the leader server may receive the forwarded request to add the new server to the distributed file system. The leader server may perform one or more verification operations for the new server that is to be added to the distributed file system. Such verification operations may include a determination as to whether the new server is already included in the distributed file system. For example, the leader server may determine if the new server is currently included as a server in the distributed file system from the configuration data stored at the leader server. Another such operation may be to verify that each server in the configuration cluster is currently online and available. For example, the leader server may transmit queries to each of the servers in the configuration cluster and upon receiving the query from the leader server, each respective server in the configuration cluster may transmit a response to the leader server that indicates that the server is online and available to change its locally stored configuration data. In response to receiving such queries from each of the servers in the configuration cluster, the leader server may then transmit data to change the configuration data in each of the servers in the configuration cluster. However, if one of the servers in the configuration cluster is unavailable or a threshold number or percentage of the servers in the configuration cluster are unavailable or offline, then the leader server may not transmit data to change the configuration data.

In some embodiments, the configuration data may describe or include information relating to the management of the distributed file system. For example, the configuration data may identify servers that are currently included in the distributed file system and volumes used in the distributed file system. The configuration data may be used when a server of the distributed file system is started or booted up. For example, when a server of the distributed file system is restarted, the configuration may be used to synchronize the server with the other servers of the distributed file system.

As such, a server in the distributed file system may receive a request to change the configuration of a distributed file system. The server may be included in a configuration cluster that stores configuration data and files of the distributed file system. In some embodiments, if a server that is not included in the configuration cluster receives the request, then the request may be forwarded to a server in the configuration cluster. The server may identify a leader server of the configuration cluster and may forward the request to change the configuration to the leader server. The leader server may verify that the change to the configuration is valid (e.g., that the server to be added is not already included or that the server to be removed is included in the distributed file system) and may transmit queries to each server in the configuration cluster if the verification is successful or may not transmit the queries if the verification is not successful. Upon receiving a successful response from each of the servers in the configuration cluster, the leader server may commit the change to the configuration data by changing the configuration data stored at the leader server and transmitting data identifying the change to the configuration data to each of the other servers in the configuration cluster that may implement the same change after receiving the data from the leader server.

Figure 4A:
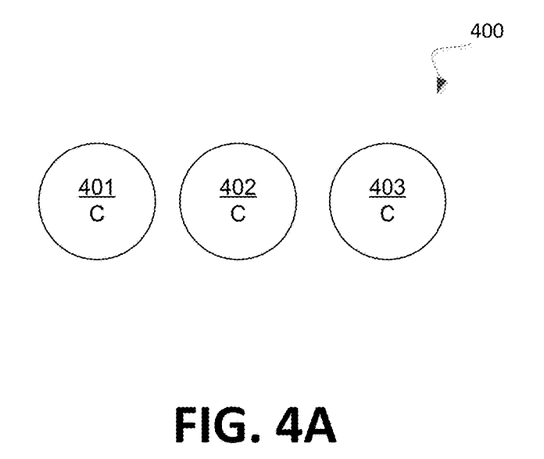
FIG. 4A is an illustration of a group of servers in a distributed file system in accordance with some embodiments of the disclosure.

FIG. 4A is an illustration of a group of servers 400 in a distributed file system. In general, the group of servers 400 may include multiple servers that correspond to a distributed file system 101 of FIG. 1.

As shown in FIG. 4A, the group of servers 400 may include a first server 401, a second server 402, and a third server 403. In some embodiments, the selection of servers to be included in a configuration cluster to store configuration data of the distributed file system may be based on a quorum requirement that determines a minimum number of servers to be included in the configuration cluster. For example, as shown, the quorum requirement may be three servers. As such, each of the first server 401, second server 402, and third server 403 may be in the configuration cluster.

Figure 4B:
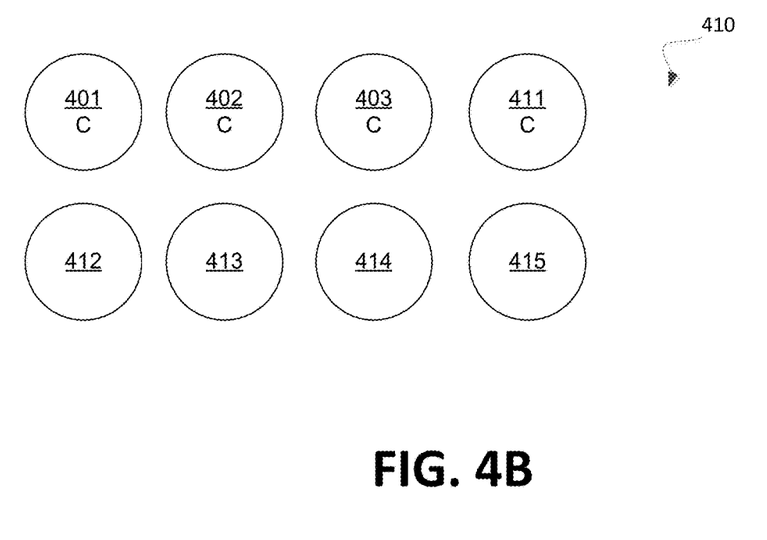
FIG. 4B is another illustration of a group of servers in a distributed file system in accordance with some embodiments of the disclosure.

FIG. 4B is another illustration of a group of servers 410 in a distributed file system. In general, the group of servers 410 may correspond to the distributed file system of FIG. 4A after the adding of new servers to the distributed file system.

As shown in FIG. 4B, the group of servers 410 may include the first, second, and third servers 401-403 and also include the new servers 411-415. In some embodiments, the new server 411 may be included in the configuration cluster to store configuration data of the distributed file system. In some embodiments, the new server 411 may be included in the configuration cluster based on characteristics of the server 411 and the characteristics of the servers 401-403 that are currently included in the configuration cluster. Further details with regards to including a server in a configuration cluster based on characteristics are described in conjunction with FIG. 5.

Figure 4C:
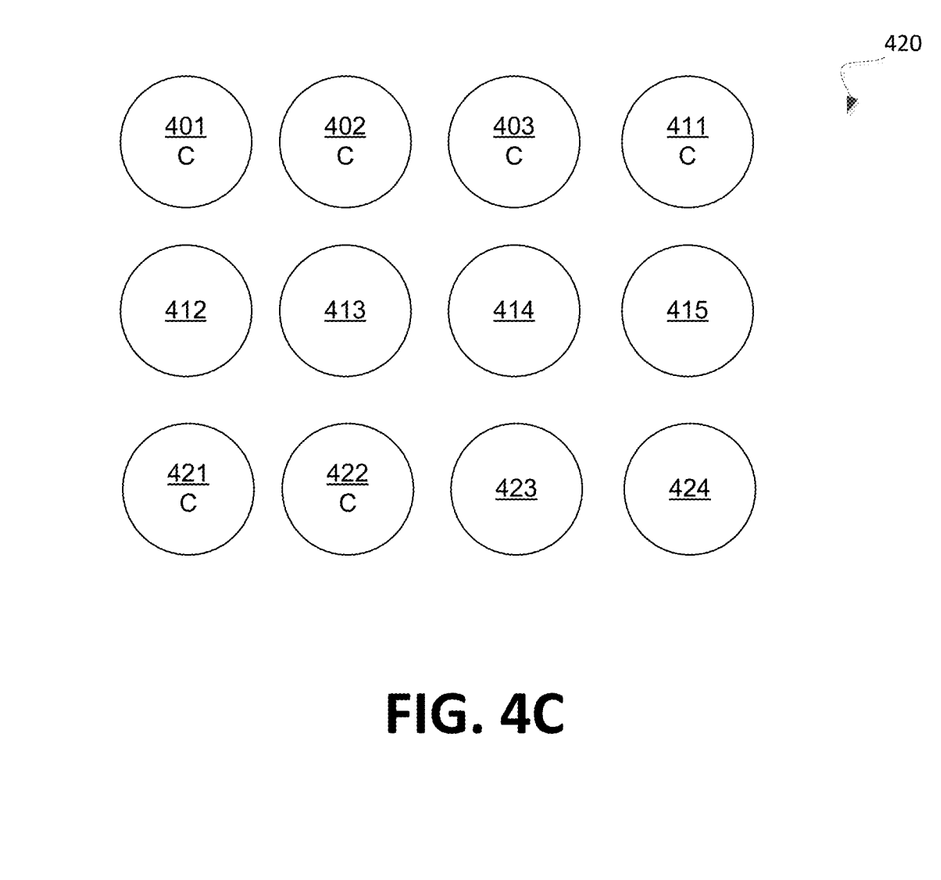
FIG. 4C is another illustration of a group of servers in a distributed file system in accordance with some embodiments of the disclosure.

FIG. 4C is another illustration of a group of servers 420 in a distributed file system. In general, the group of servers 420 may correspond to the distributed file system of FIG. 4B after the adding of additional servers to the distributed file system.

As shown in FIG. 4C, the group of servers 420 may include the servers 401-403 and the server 411 that are each included in the configuration cluster of the distributed file system. The group of servers 420 may further include servers 412-415 that were not included in the configuration cluster. Furthermore, servers 421-424 may be added to the distributed file system. The servers 421 and 422 may be added to the configuration cluster based on a policy for the distributed file system. For example, a policy may be set for the distributed file system to specify that a particular percentage of the servers are to be included in the configuration cluster. As shown, the policy may specify that 50% of the servers are to be included in the configuration cluster. As such, servers 421 and 422 may be included in the configuration cluster when added to the distributed file system so that the number of servers in the configuration cluster satisfies the policy.

Figure 5:
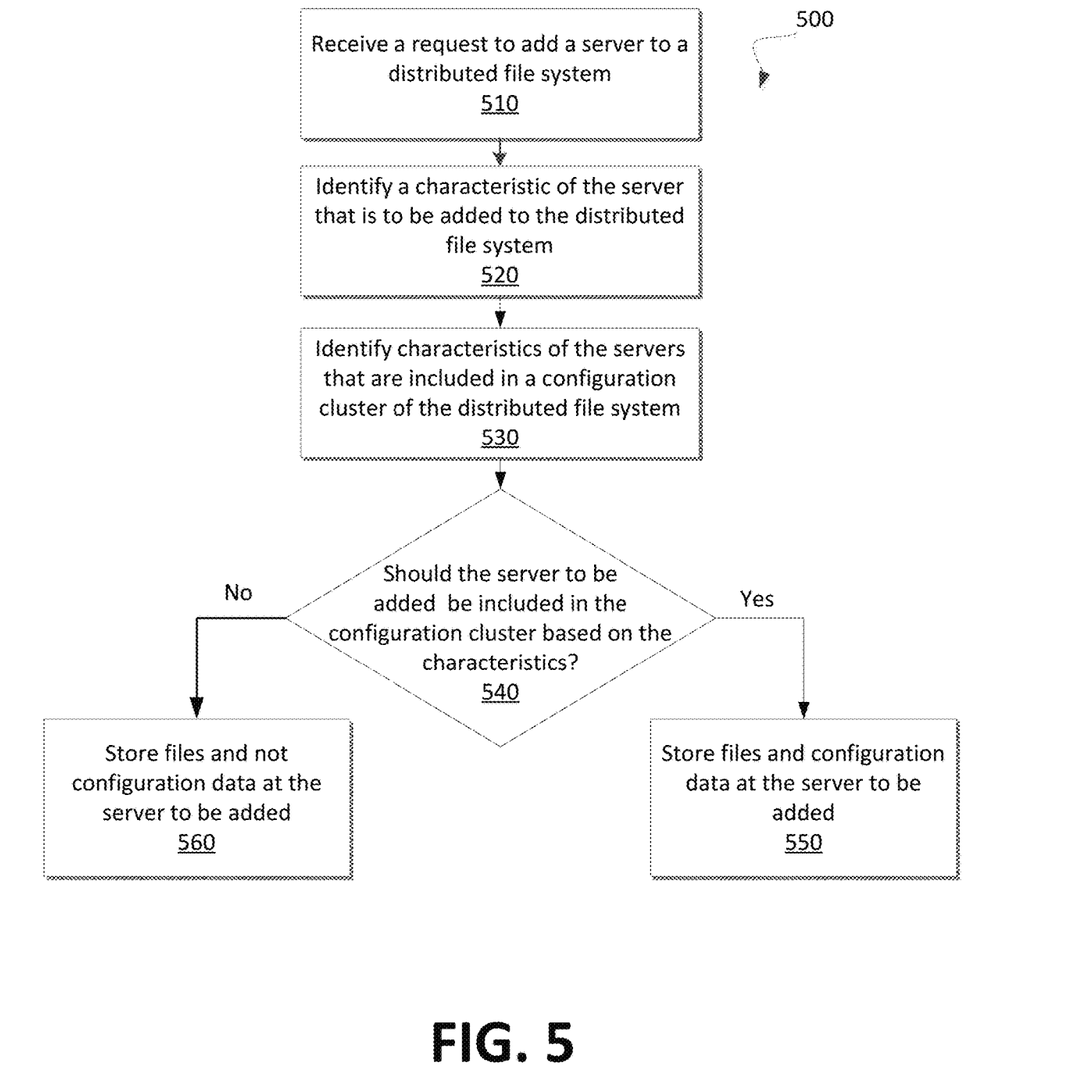
FIG. 5 is a flow diagram of an example method to determine whether to include a storage server in a configuration cluster of the distributed file system in accordance with some embodiments.

FIG. 5 is a flow diagram of an example method 500 to determine whether to include a server in a configuration cluster of the distributed file system. The method 500 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 500 may be performed by a configuration data controller 190 or 200 as described with regard to FIG. 1 or 2.

As shown in FIG. 5, the method 500 may begin with the processing logic receiving a request to add a server to a distributed file system (block 510). In response to the request to add the server, the processing logic may identify a characteristic of the server that is to be added to the distributed file system (block 520). For example, a location of the server may be received or identified. In some embodiments, the location may correspond to a physical location within a data center or within a network rack of servers. For example, the location in a rack of servers may correspond to a column and/or a row location within the rack of servers. The processing logic may further identify characteristics of servers in a configuration cluster in the distributed file system (block 530). For example, the physical locations of the servers that are currently in the configuration cluster may be identified. Subsequently, the processing logic may determine if the server to be added to the distributed file system should be included in the configuration cluster based on the characteristics of the server to be added and the characteristics of the servers that are currently included in the configuration cluster (block 540). If the processing logic determines that the server that is to be added to the distributed file system should be included in the configuration cluster based on the various characteristics, then the server may be added to the distributed file system and may store files and the configuration data of the distributed file system (block 550). In some embodiments, instead of adding the server to the distributed file system, a recommendation message may be provided to include the server in the configuration cluster. However, if the processing logic determines that the server that is to be added should not be included in the configuration cluster then the server may be added to the distributed file system and may store files and not the configuration data of the distributed file system (block 560). In alternative embodiments, a recommendation message may be provided to not include the server in the configuration cluster.

In some embodiments, the server that is being added to the distributed file system may be included in the configuration cluster when the location of the server that is being added is not a location of any of the servers that are currently in the configuration cluster. For example, if the server that is to be added is in a first location (e.g., a first row in a rack of servers) and the servers currently included in the configuration cluster are in a second location (e.g., a second row in the rack of servers), then the server that is to be added may be included in the configuration cluster. However, if the server that is to be added is in the same location as other servers in the configuration cluster then the server that is to be added to the distributed file system may not be included in the configuration cluster. The addition of the server in the first location may improve the reliability of the configuration data by diversifying the locations of the servers that are in the configuration cluster. In the same or alternative embodiments, the server that is being added to the distributed file system may be included in the configuration cluster based on a type of server. For example, if the server that is being added is a different type of server (e.g., with a different storage device or resource) than the servers that are currently in the configuration cluster, then the server that is being added may be included in the configuration cluster. However, if the server that is being added is the same type of server of other servers in the configuration cluster, then the server that is being added may not be included in the configuration cluster.

Figure 6:
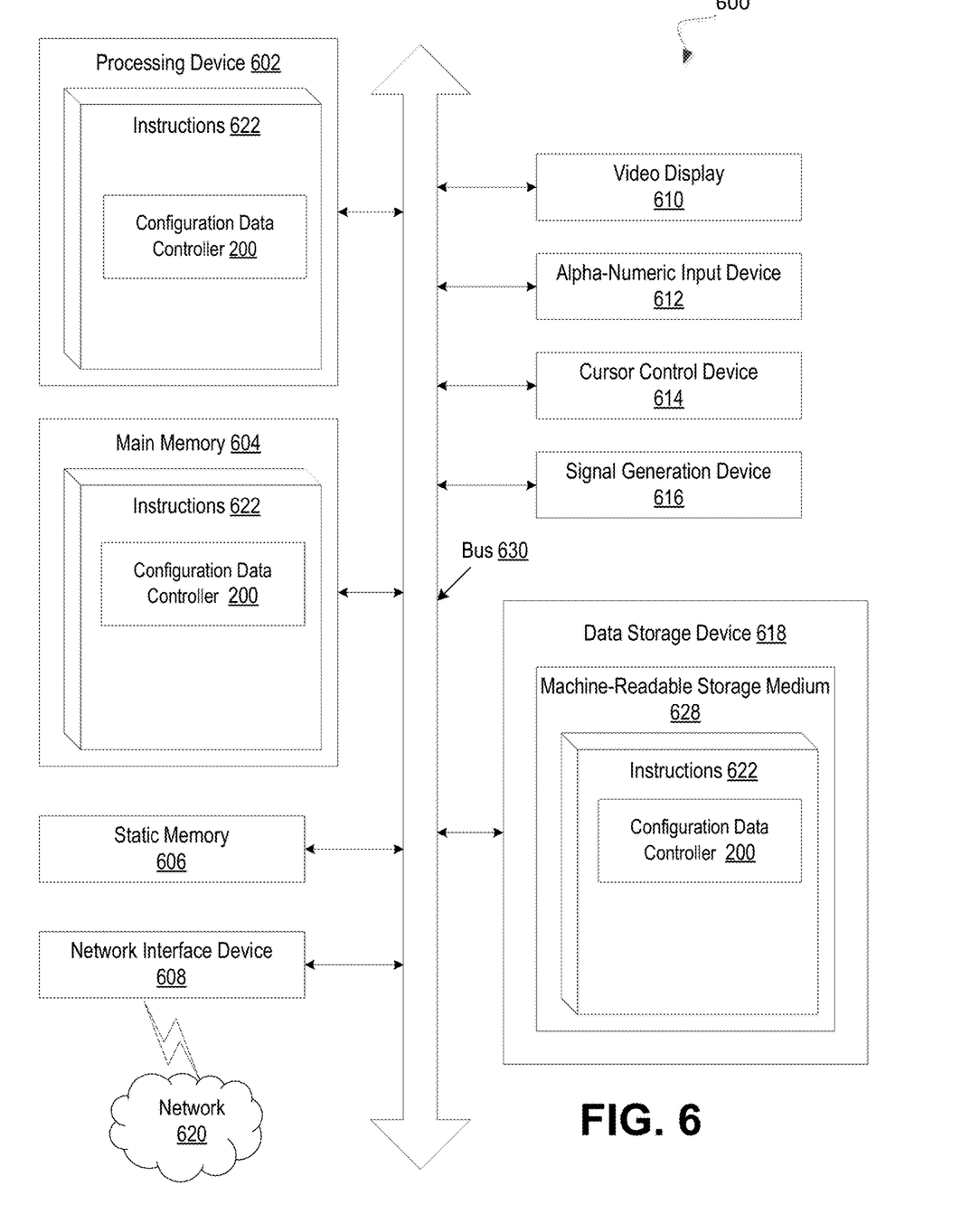
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media. The processing device 602 may be operatively coupled with the data store device 618, machine-readable storage medium 628, and/or the main memory 604.

In one implementation, the instructions 622 include instructions for a configuration data controller (e.g., configuration data controller 190 of FIG. 1 and/or configuration data controller 200 of FIG. 2) and/or a software library containing methods that call operations of a configuration data controller. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    receiving a request to change a configuration of a distributed storage system, wherein the request identifies a server to add to the distributed storage system, and wherein the distributed storage system comprises a set of servers and the set comprises a subset of configuration servers that store configuration data identifying the servers in the set;
    adding, by a processing device of a leader server, the server to the set of servers of the distributed storage system;
    identifying, by the leader server, a characteristic of the server and characteristics of the configuration servers in the subset, wherein the characteristic of the server comprises a physical location of the server;

determining, by the leader server, that the physical location of the server is different from physical locations of the configuration servers in the subset;

adding, by the leader server, the server to the subset of configuration servers based on the physical location, wherein the server further diversifies physical locations of the subset of configuration servers; and providing an indication to modify the configuration data stored by each of the configuration servers in the subset to include the server.

2. The method of claim 1, wherein the request to change the configuration of the distributed storage system is forwarded to the leader server from one of the servers in the set of servers of the distributed storage system.

3. The method of claim 1, wherein the subset of configuration servers is a configuration cluster that comprises the leader server, and wherein the configuration data is stored by each server internal to the subset without being stored by any one server external to the subset.

4. The method of claim 1, wherein providing the indication to modify the configuration data comprises:

transmitting information to each respective configuration server in the subset to modify configuration data stored at the respective configuration server.

5. The method of claim 1, wherein the configuration data identifies each server of the set that stores data of the distributed storage system, and wherein the configuration data is modified to identify the server identified by the request.

6. The method of claim 1, further comprising:

identifying characteristics of a plurality of servers of the distributed storage system; and verifying the change to the configuration of the distributed storage system in view of the characteristic of the server and the characteristics of the plurality of servers of the distributed storage system.

7. The method of claim 1, further comprising:

determining whether the server identified by the request is compatible with the servers of the distributed storage system; and verifying the change to the configuration of the distributed storage system in view of the determination of whether the server identified by the request is compatible with the servers of the distributed storage system.

8. A system comprising:

a memory; and a processing device, operatively coupled with the memory, to:

receive a request to change a configuration of a distributed storage system, wherein the request identifies a server to add to the distributed storage system, and wherein the distributed storage system comprises a set of servers and the set comprises a subset of configuration servers that store configuration data identifying the servers in the set;

add the server to the set of servers of the distributed storage system;

identify a characteristic of the server and characteristics of the configuration servers in the subset, wherein the characteristic of the server comprise a physical location of the server;

determine that the physical location of the server is different from physical locations of the configuration servers in the subset;

add the server to the subset of configuration servers based on the physical location, wherein the server further diversifies physical locations of the subset of configuration servers; and provide an indication to modify the configuration data stored by each of the configuration servers in the subset to include the server.

9. The system of claim 8, wherein the request to change the configuration of the distributed storage system is forwarded to a leader server from one of the servers in the set of servers of the distributed storage system.

10. The system of claim 9, wherein the subset of configuration servers is a configuration cluster that comprises the leader server.

11. The system of claim 8, wherein to provide the indication to modify the configuration data, the processing device is further to:

transmit information to each respective configuration server in the subset to modify configuration data stored at the respective configuration server.

12. The system of claim 8, wherein the configuration data identifies each server of the set that stores data of the distributed storage system, and wherein the configuration data is modified to identify the server identified by the request.

13. The system of claim 8, wherein the processing device is further to:

identify characteristics of a plurality of servers of the distributed storage system; and verify the change to the configuration of the distributed storage system in view of the characteristic of the server and the characteristics of the plurality of servers of the distributed storage system.

14. The system of claim 8, wherein the processing device is further to:

determine whether the server identified by the request is compatible with the servers of the distributed storage system; and verify the change to the configuration of the distributed storage system in view of the determination of whether the server identified by the request is compatible with the servers of the distributed storage system.

15. A non-transitory computer readable medium comprising instructions, which when executed by a processing device, cause the processing device to:

receive a request to change a configuration of a distributed storage system, wherein the request identifies a server to add to the distributed storage system, and wherein the distributed storage system comprises a set of servers and the set comprises a subset of configuration servers that store configuration data identifying the servers in the set;

add the server to the set of servers of the distributed storage system;

identify a characteristic of the server and characteristics of the configuration servers in the subset, wherein the characteristic of the server comprises a physical location of the server;

determine that the physical location of the server is different from physical locations of the configuration servers in the subset;

add the server to the subset of configuration servers based on the physical location, wherein the server further diversifies physical locations of the subset of configuration servers; and provide an indication to modify the configuration data stored by each of the servers in the subset to include the server.

16. The non-transitory computer readable medium of claim 15, wherein the request to change the configuration of the distributed storage system is forwarded to a leader server from one of the servers in the set of servers of the distributed storage system.

17. The non-transitory computer readable medium of claim 16, wherein the subset of configuration servers is a configuration cluster that comprises the leader server.

18. The non-transitory computer readable medium of claim 15, wherein to provide the indication to modify the configuration data, the processing device is further to:
transmit information to each respective configuration server in the subset to modify configuration data stored at the respective configuration server.

19. The non-transitory computer readable medium of claim 15, wherein the processing device is further to:
identify characteristics of a plurality of servers of the distributed storage system; and
verify the change to the configuration of the distributed storage system in view of the characteristic of the server to be added and the characteristics of the plurality of servers of the distributed storage system.

20. The non-transitory computer readable medium of claim 15, wherein the processing device is further to:
determine whether the server identified by the request is compatible with the servers of the distributed storage system; and
verify the change to the configuration of the distributed storage system in view of the determination of whether the server identified by the request is compatible with the servers of the distributed storage system.

* * * * *